US005349484A

United States Patent [19]
Koehler

[11] Patent Number: 5,349,484
[45] Date of Patent: Sep. 20, 1994

[54] LIGHT PATTERN DETECTION FOR FILM EDGE FOLLOWING

[75] Inventor: Steven F. Koehler, Rochester, N.Y.

[73] Assignee: Eastman Kodak Company, Rochester, N.Y.

[21] Appl. No.: 995,434

[22] Filed: Dec. 23, 1992

[51] Int. Cl.⁵ .................. G11B 5/584; G11B 7/00; G03B 17/24; G01N 21/86
[52] U.S. Cl. .............. 360/77.12; 360/77.03; 369/125; 250/548; 354/106; 356/400
[58] Field of Search .............. 360/77.02, 77.03, 77.01, 360/77.12, 75; 250/557, 548, 560, 561; 554/215; 369/125; 354/106; 356/399, 400

[56] References Cited

U.S. PATENT DOCUMENTS

| | | | |
|---|---|---|---|
| 4,176,381 | 11/1979 | de Niet et al. | 360/77 |
| 4,558,383 | 12/1985 | Johnson | 360/77 |
| 4,816,939 | 3/1989 | Ford et al. | 360/77.03 |
| 4,843,494 | 6/1989 | Cronin et al. | 360/77.03 |
| 4,987,505 | 1/1991 | Iwabuchi et al. | 360/103 |

Primary Examiner—Aristotelis Psitos
Assistant Examiner—Varsha A. Kapadia
Attorney, Agent, or Firm—David A. Hall

[57] ABSTRACT

A method of and apparatus for accurately positioning a magnetic read head in relation to a magnetic data track recorded in a magnetic recording medium of a photographic filmstrip. The read head is precisely aligned with one edge of the moving filmstrip through the use of an optical detector and an optical pattern placed below the filmstrip and extending beyond one edge of the filmstrip. The portion of the optical detector field of view corresponding to the optical pattern and the portion corresponding to the filmstrip are detected and the detected signal is processed to provide a control signal for moving the read head with respect to the film edge so as to position the head a precise distance away from the edge of the filmstrip without requiring physical contact with the filmstrip edge.

10 Claims, 3 Drawing Sheets

LIGHT PATTERN DETECTION FOR FILM EDGE FOLLOWING

BACKGROUND OF THE INVENTION

1. Field of the Invention

The present invention relates generally to photographic printing systems and, more particularly, to photographic printing systems that can read data recorded in a magnetic recording material of a photographic filmstrip.

2. Description of the Related Art

Data recording photographic cameras have magnetic write heads that write data on recordable photographic filmstrips as frames of latent images are exposed. After the filmstrip is developed, the data can be retrieved by a magnetic read head of a photographic printer. Such data can comprise, for example, data relating to the exposure parameters used by the camera when exposing the frame, a camera identification number, and the date of producing the exposure. As a developed filmstrip is passed through a suitably equipped photographic printer to produce finished prints, the magnetic read head of the printer reads the data from the filmstrip. The recorded exposure data can be used by the printer in setting printer parameters, such as color balance, and the identification and date data can be printed on the finished prints as a matter of interest to the photographer.

The recordable photographic filmstrip used in a data recording camera includes a magnetic recording material that is deposited on the filmstrip or is integrally formed with the film emulsion or substrate. Generally, the magnetic recording material is deposited in a thin transparent layer over the entire surface of the photographic filmstrip and is referred to as the magnetics-on-film (MOF) layer. As frames are exposed in the data recording camera, the data is recorded into the MOF layer of the filmstrip in longitudinal data tracks that typically extend along one edge of the filmstrip outside of the frames.

To read the recorded data from the developed filmstrip, a photographic printer must include a head assembly having a magnetic read head. The magnetic read head must be positioned accurately over the data tracks of the MOF layer and must be maintained in proper position over the data tracks as the filmstrip is moved through the printer. As the filmstrip is moved, relative movement occurs between the filmstrip and the magnetic read head. Ideally, the read head remains located above the longitudinal data tracks and therefore can accurately read the data. If the relative movement produces lateral displacement between the magnetic read head and the data tracks, inaccurate reading of the recorded data can occur.

One technique for reading data from the MOF layer of a recordable photographic filmstrip is to provide the head assembly of the photographic printer with a guide plate that is oriented perpendicular to the edge of the filmstrip and is pressed against the edge. The filmstrip is kept under tension and therefore remains substantially taut against the pressure. The data tracks are recorded in the filmstrip MOF layer at a predetermined distance from the edge because, in a data recording camera, the magnetic write head is located a predetermined distance from the edge of the path followed by the filmstrip in the camera. Therefore, in the photographic printer, the magnetic read head can be located a predetermined distance from the guide plate such that the read head is properly positioned over the data tracks when the guide plate is in contact with the edge of the filmstrip.

For example, if the edge of a recordable photographic filmstrip closest to the top of the frames is defined to be the top edge, then the filmstrip may have a sequence of data tracks written along the lower edge. As the filmstrip is moved through the printer, the guide-plate is urged upwardly against the bottom edge of the filmstrip. Further upward movement is prevented by the guide plate rubbing up against the taut edge of the filmstrip, and the magnetic read head thereby is properly positioned over the data tracks. Unfortunately, such guide plates can damage the filmstrip and cause excessive wear because of the friction and pressure generated by the guide plate as it presses against the filmstrip.

Some optical techniques are known outside the photographic field for properly positioning magnetic read heads above data tracks recorded in magnetic storage media, such as magnetic tapes or disks. The optical techniques improve read head tracking in the magnetic storage media and do not require physical contact with the magnetic media for proper tracking. Therefore, they do not cause damage or excessive wear. Such techniques, however, make use of specially prepared magnetic media that incorporate optical patterns in the magnetic media and are not intended for use with photographic filmstrips. Such techniques reduce the surface area of the magnetic media that can be used for other purposes. See, for example, U.S. Pat. No. 4,987,505 to Iwabuchi, et al. and U.S. Pat. No. 4,816,939 to Ford, et al. Such techniques, if adapted for use with photographic filmstrips, would reduce the area of the filmstrip available for the photographic image frames.

Other optical techniques for use with magnetic media include a pair of light-emitting elements placed beneath the top and bottom edges of the magnetic media. Corresponding light-receiving elements of a magnetic head assembly detect variations in the relative amounts of light received from the emitters and generate positioning control signals. Such techniques require that the light receiving and emitting elements straddle the magnetic media. Therefore, the magnetic media must be of predetermined, constant width. See, for example, U.S. Pat. No. 4,176,381 to de Niet, et al. Variations in the width of the magnetic media cannot easily be accommodated. Such techniques, if adapted for photographic printers, would limit the processing of multiple film formats.

From the discussion above, it should be apparent that there is a need for a system that accurately maintains a magnetic head of a photographic printer in proper position over magnetic data tracks recorded in a magnetic recording material of a photographic filmstrip without damaging the filmstrip or causing excessive wear and without requiring specially prepared, optically encoded filmstrips. The present invention satisfies this need.

SUMMARY OF THE INVENTION

In accordance with the invention, a technique for positioning a magnetic read head above a data track recorded in a magnetic recording material of a recordable photographic filmstrip as relative movement occurs between the head and the filmstrip includes (1) locating a predetermined optical pattern beneath the photographic filmstrip such that a portion of the optical pattern extends beyond one edge of the filmstrip, (2) locating the magnetic read head above the data track in the photographic filmstrip, (3) optically detecting a field of view, relative to the magnetic read head, that encompasses the filmstrip edge and a portion of the optical pattern that extends beyond the filmstrip edge, and (4) moving the head such that the proportion of the detected optical field of view encompassing the filmstrip to the proportion of the detected optical field of view encompassing the optical pattern is substantially constant as the relative movement occurs between the head and the filmstrip. In this way, the position of the magnetic read head relative to the edge of the filmstrip, and relative to the data track, remains substantially constant as relative movement occurs between the filmstrip and the magnetic read head.

An apparatus in accordance with the present invention accurately positions a magnetic read head above a photographic filmstrip and includes (1) a predetermined optical pattern located beneath the photographic filmstrip such that a portion of the optical pattern extends beyond one edge of the filmstrip, (2) detector means, positioned a predetermined distance relative to the magnetic read head, for optically detecting a field of view that encompasses the filmstrip edge and a portion of the optical pattern that extends beyond the filmstrip edge, and (3) positioning means for moving the head such that the proportion of the detector means field of view filled with the filmstrip to the proportion of the detector means field of view filled with the optical pattern is substantially constant as relative movement occurs between the filmstrip and the magnetic read head. Such an apparatus can be incorporated, for example, in a photographic printer.

The invention utilizes a recordable photographic filmstrip that includes a magnetic recording material that is deposited on the film or that is part of the film emulsion or substrate. The data is recorded into the filmstrip, for example, with a data recording camera that writes the data into the magnetic recording material of the filmstrip in longitudinal data tracks extending along one edge of the filmstrip as the camera produces exposures.

In particular, a photographic printer in accordance with the invention includes an optical pattern that extends outwardly from beneath a photographic filmstrip, a head assembly including a magnetic read head and an optical detector that is positioned a predetermined distance from the magnetic read head, and a control system that receives signals from the optical detector and generates control signals to position the head assembly. Many varieties of optical patterns and detectors can be used, such as those described in the patents referred to above in connection with magnetic media. For example, supplemental illumination, such as infrared light, can be provided.

A portion of the optical detector field of view is filled with the filmstrip and a remaining portion of the optical detector field of view is filled with the optical pattern. The head assembly of the printer produces a detector signal that indicates the relative portions of the optical detector field of view that are filled with the filmstrip and that are filled with the optical pattern. If one of the portions of the optical detector field of view is increasing, then the printer moves the head assembly toward the corresponding portion of the optical detector field of view that is decreasing.

The optical printer therefore moves the head assembly such that the respective portions of the optical detector field of view filled with the optical pattern and filled with the photographic filmstrip are maintained substantially constant. The magnetic read head and optical detector are positioned relative to one another such that the magnetic read head is maintained in proper position over the data track in the filmstrip when the relative field of view portions are maintained substantially constant. In this way, the head assembly accurately follows the edge of the filmstrip and the magnetic read head accurately reads the data from the filmstrip without pressing a guide plate against the filmstrip edge, thereby reducing damage and excessive wear to the filmstrip.

In another aspect of the invention, a photographic printer includes a magnetic write head so that data can be written onto the magnetic recording material of the recordable photographic filmstrip as the filmstrip is passed through the printer. In this way, at the time of printing, data can be added to the exposure data already recorded by the data recording camera when the exposure was made. The data can be written with confidence that it can be written and retrieved accurately, given the head positioning accuracy of the head positioning system in accordance with the invention.

Other features and advantages of the present invention should be apparent from the following description of the preferred embodiments, which illustrate, by way of example, the principles of the invention.

DESCRIPTION OF THE PREFERRED EMBODIMENTS

Figure 1:
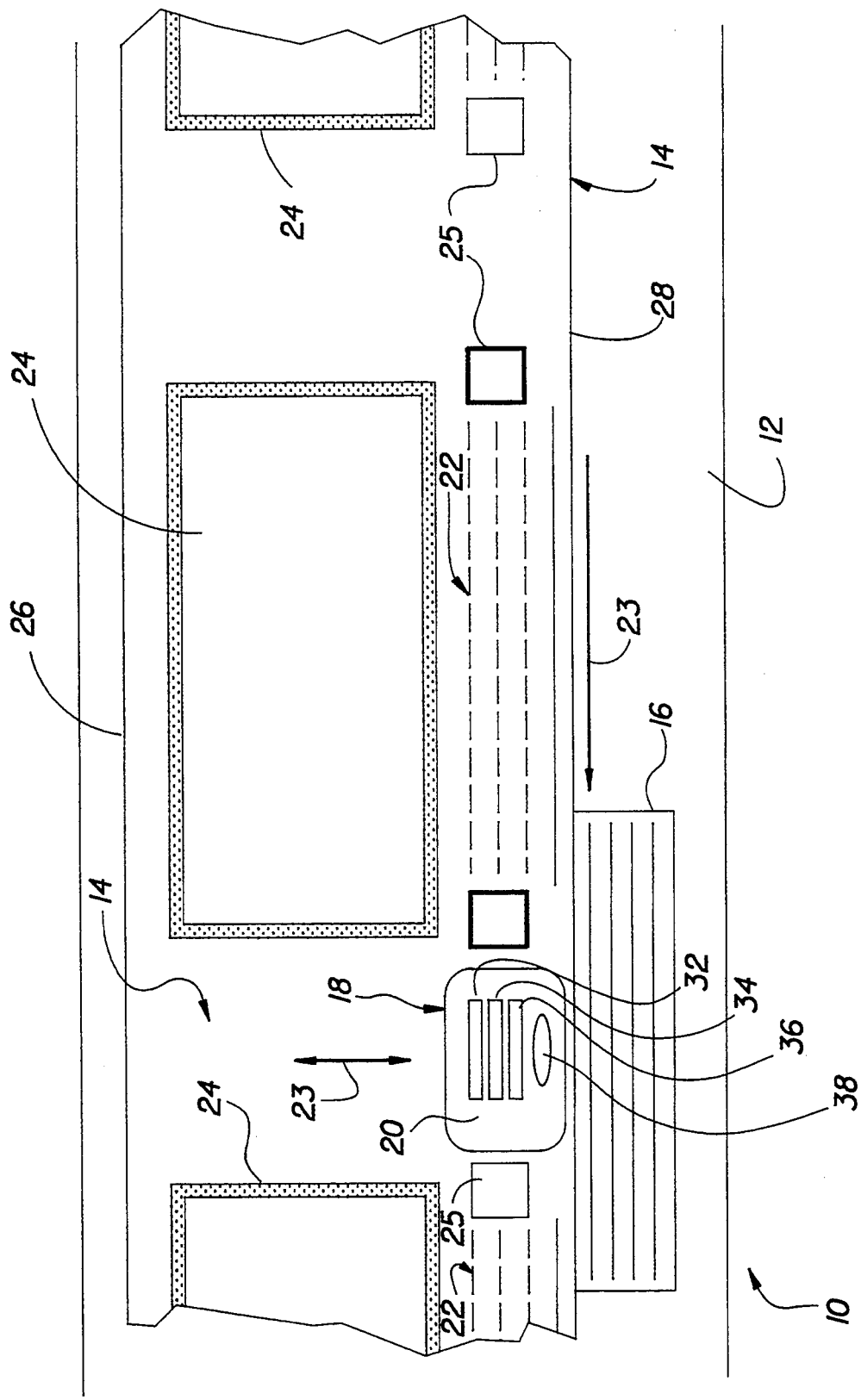
FIG. 1 is a schematic plan view of a photographic printer head assembly constructed in accordance with the present invention showing data tracks recorded in a photographic filmstrip.
Figure 2:
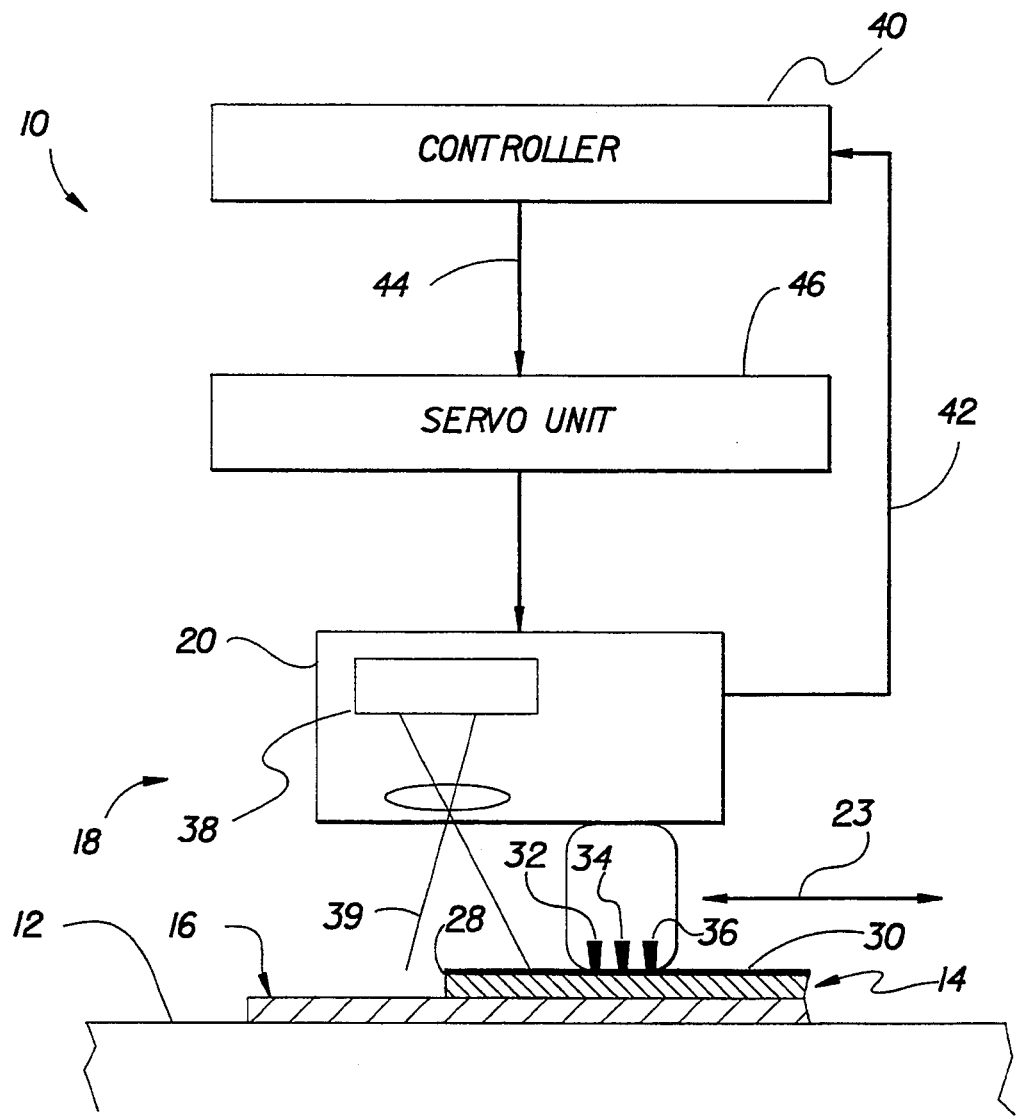
FIG. 2 is a schematic elevational view of the photographic printer head assembly illustrated in FIG. 1.

FIGS. 1 and 2 show a photographic printer 10, constructed in accordance with the present invention, that includes a flat top surface 12 across which a developed recordable photographic filmstrip 14 can be held taut. A predetermined optical pattern 16 is placed on the printer top surface 12 beneath the filmstrip such that a portion of the optical pattern extends beyond the filmstrip. A head assembly 18 is suspended above the top surface 12 and includes a combined magnetic-optical read head 20 that magnetically reads data tracks 22 written into the filmstrip and optically views the predetermined optical pattern 16 and the filmstrip 14. The printer 10 maintains the read head in position over the data tracks by ensuring that the portion of the read head field of view filled with the optical pattern relative to the portion of the field of view filled with the filmstrip is maintained substantially constant as the filmstrip is moved from right to left in FIG. 1. In this way, the read head 20 accurately follows the edge of the filmstrip 14 and accurately reads data from the data tracks 22 without pressing against the edge of the filmstrip. This reduces damage and excessive wear to the filmstrip.

The photographic filmstrip 14 includes a magnetic recording material that is deposited on the film or is formed with the film emulsion or substrate. In the preferred embodiment, the filmstrip has a magnetic recording material that is deposited in a thin transparent layer over the entire surface of the filmstrip and is referred to as the magnetics-on-film (MOF) layer 30 (FIG. 2). As the filmstrip is advanced through the camera, a sequence of frames 24 are exposed. The frames define a top edge 26 of the filmstrip and define a bottom edge 28 of the filmstrip when the frames are oriented for correct viewing. The data tracks 22 extend along the bottom edge 28 of the filmstrip and are written into the MOF layer as the frames 24 are exposed in a data recording camera.

More particularly, the combined magnetic-optical read head 20 includes multiple magnetic read heads 32, 34, 36 and includes an optical detector 38. The optical detector has a field of view 39 that encompasses the portion of the predetermined optical pattern 16 that extends beyond the edge of the filmstrip 14 and also encompasses a portion of the filmstrip including the bottom edge 28. As noted above, the head assembly 18 will be properly positioned as the filmstrip is run through the printer 10 if the portion of the optical detector field of view filled with the optical pattern remains constant in comparison to the portion of the field of view filled with the filmstrip. In FIG. 2, the optical pattern 16 and the photographic filmstrip 14 are illustrated as filling approximately one-half of the optical detector field of view 39. It should be understood, however, that other relative proportions also are suitable. The most desirable proportions will depend on the particular pattern and detector used. The precise optical pattern and associated optical detector can be selected from among those well-known in the art, such as those described above in connection with magnetic storage media, and need not be described further herein.

FIG. 2 shows that the printer 10 includes a controller 40 that receives a detector signal 42 from the optical detector 38 indicating the relative proportions of the detector field of view 39 that are filled with the optical pattern 16 and that are filled with the photographic filmstrip 14. As the filmstrip is moved through the photographic printer, producing relative movement between the filmstrip and the head assembly 18, lateral movement can occur between the filmstrip and the magnetic read heads 32, 34, 36. Such lateral movement can cause the magnetic read heads to mistrack, or not remain in position over the data tracks 22. When such mistracking occurs, the portion of the optical detector field of view filled with the optical pattern 16 relative to the portion filled with the filmstrip 14 will change. This causes the detector signal 42 from the optical detector 38 to change.

The controller 40 determines if the detector signal 42 indicates that one portion of the field of view 39 or the other is increasing. Based on this determination, the controller produces an error signal 44 and provides it to a servo unit 46 that can move the head assembly 18 relative to the filmstrip 14. If the portion of the field of view filled with the filmstrip is increasing, then the head assembly 18 is moving toward the top edge 26 of the filmstrip and should be moved toward the bottom edge 28 of the filmstrip. If the portion of the field of view filled with the optical pattern is increasing, then the head assembly is moving away from the top edge 26 of the filmstrip, out above the optical pattern, and should be moved toward the top edge 26 of the filmstrip. That is, when the relative portions of the field of view 39 filled with the filmstrip and the optical pattern are changing, the head assembly should be moved in the direction of the decreasing portion.

Therefore, the controller 40 responds to a detector signal 42 that indicates the optical pattern is filling the field of view 39 by providing an error signal 44 to the servo unit 46 that causes the servo unit to move the head assembly 18 up toward the top edge 26 of the photographic filmstrip 14. Likewise, the controller responds to a detector signal that indicates the filmstrip is filling the field of view by providing an error signal that causes the servo unit to move the head assembly down, above the optical pattern 16 extending from beneath the filmstrip.

Thus, the optical printer 10 moves the head assembly 18 such that the respective portions of the optical detector field of view 39 filled with the optical pattern 16 and filled with the photographic filmstrip 14 are maintained substantially constant as the filmstrip is moved through the printer. In this way, the head assembly 18 accurately follows the edge of the filmstrip and the magnetic read heads 32, 34, 36 accurately read the data tracks 22 of the filmstrip without pressing a guide plate against the filmstrip edge, thereby reducing damage and excessive wear to the filmstrip.

Figure 3:
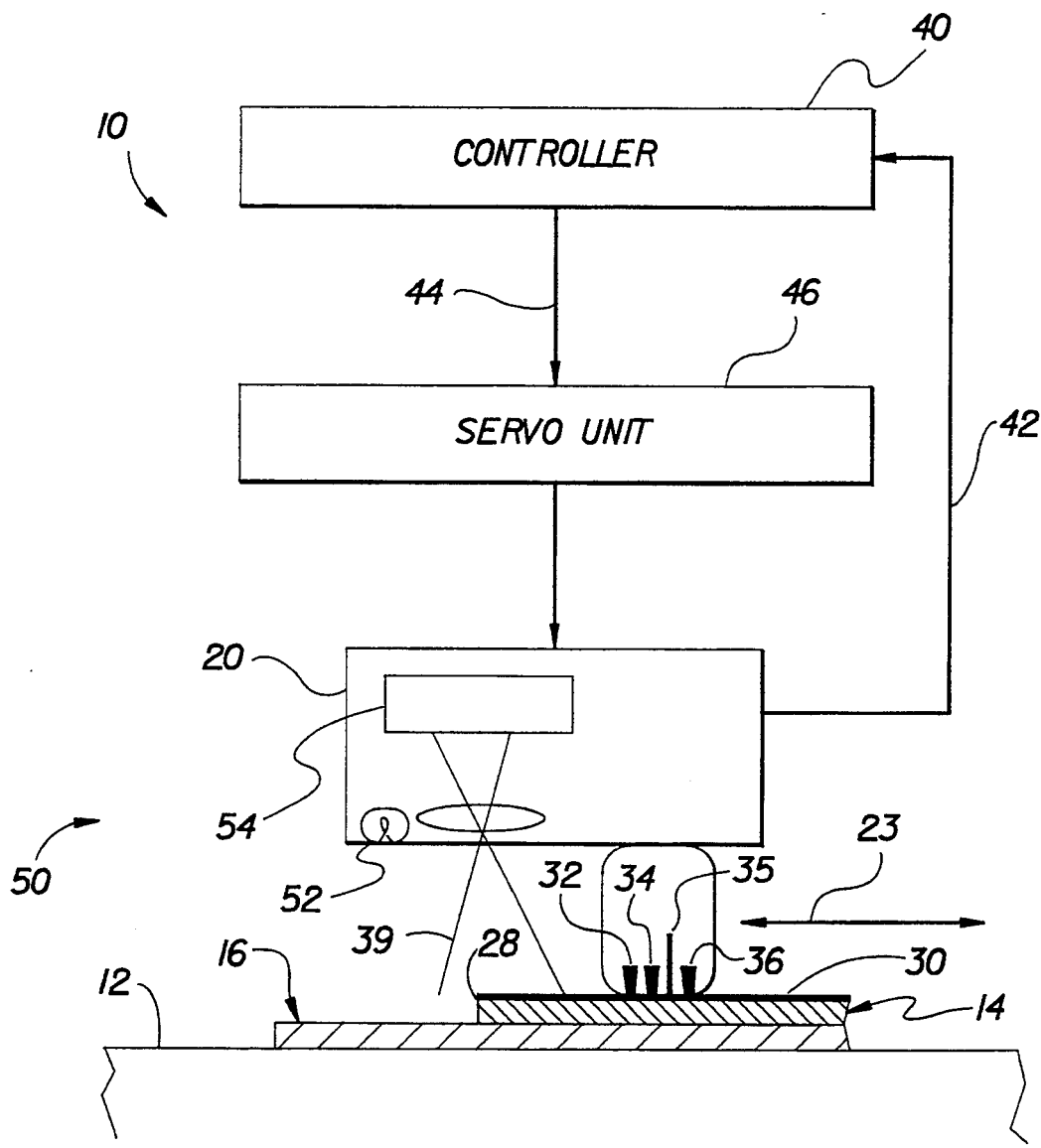
FIG. 3 is a schematic elevational view of a second head assembly also constructed in accordance with the invention.

It may be desirable to write data into the MOF layer 30 of the recordable photographic filmstrip 14 as prints are produced. The data may indicate, for example, the printer parameters used, which might be helpful in making additional prints, or the data may indicate the total number of prints made from the filmstrip, or the data may comprise a digital representation of the frame image for computer manipulation. Therefore, one of the magnetic read heads 30 of the photographic printer 10 can be a combination magnetic read head/write head. Alternatively, an additional write head 35 can be provided, as shown in the head assembly 50 illustrated in FIG. 3. Both the combination read/write head 30 of FIG. 2 and the additional write head 35 of FIG. 3 permit writing data into the MOF layer 30 as the filmstrip 14 is moved through the printer 10. Because the head assembly 18 is accurately positioned over the data tracks 22 as the filmstrip is moved through the printer, a relatively great amount of data can be written by the printer and then read back without undue concern over inaccuracy or other error.

As noted above, the selection of a particular type of optical pattern and detector for a printer will be well-known to those skilled in the art. In the FIG. 3 embodiment of a printer 10 in accordance with the invention, for example, the head assembly 50 includes a detector that utilizes supplemental light source 52 to illuminate the optical pattern 16 with an infrared light beam. The optical detector 54 of the FIG. 3 embodiment responds to infrared light and detects the optical pattern. The infrared light advantageously will not disrupt the making of photographic prints from the filmstrip, but increases the ability of the detector to discern the pattern 16 from the filmstrip 14. It will be understood that a light source in the visible range of light need not be energized when a print is being made, but can be energized only when the filmstrip is moved.

Thus, an apparatus constructed in accordance with the present invention includes a head assembly having a read head and an optical detector whose field of view encompasses a photographic filmstrip and a predetermined optical pattern, and moves the head assembly such that the portion of the optical detector field of view filled with the optical pattern relative to the portion filled with the photographic filmstrip is maintained substantially constant. In this way, the head assembly accurately follows the edge of the filmstrip and the read head accurately reads data from the filmstrip without pressing a guide plate against the filmstrip edge, thereby reducing damage and excessive wear to the filmstrip.

The present invention has been described above in terms of a presently preferred embodiment so that an understanding of the present invention can be conveyed. There are, however, many configurations for film edge following systems not specifically described herein, but with which the present invention is applicable. The present invention should therefore not be seen as limited to the particular embodiment described herein, but rather, it should be understood that the present invention has wide applicability with respect to film edge following systems. All modifications, variations, or equivalent arrangements that are within the scope of the attached claims should therefore be considered to be within the scope of the invention.

I claim:

1. A method of positioning a magnetic read head of a photographic apparatus above a photographic filmstrip, which is supported on an apparatus top surface and has at least one data track recorded in magnetic recording material of the filmstrip, as relative movement occurs between the filmstrip and the magnetic read head, the method comprising the steps of:

placing a predetermined optical pattern on the apparatus top surface beneath the photographic filmstrip such that a portion of the optical pattern is visible beyond one edge of the filmstrip;

locating the magnetic head above the data track in the photographic filmstrip;

optically detecting a field of view, relative to the magnetic head, which encompasses the filmstrip edge and the portion of the optical pattern that is visible beyond the filmstrip edge;

moving the magnetic read head such that the proportion of the detected optical field of view filled with the filmstrip to the proportion of the detected optical field of view filled with the optical pattern is substantially constant.

2. The method as defined in claim 1, wherein the step of optically detecting a field of view includes the steps of:

locating an optical detector in a predetermined location relative to the magnetic head such that a predetermined portion of the field of view of the optical detector is filled with the filmstrip and a remaining portion of the field of view of the optical detector is filled with the optical pattern that extends beyond the filmstrip edge when the magnetic read head is properly located above the data track in the filmstrip; and producing a detector signal that indicates the relative portions of the optical detector field of view that are filled with the filmstrip and that are filled with the optical pattern as relative movement occurs between the filmstrip and the magnetic head.

3. The method as defined in claim 2, wherein the step of moving the magnetic read head comprises the steps of:

receiving the detector signal as relative movement occurs between the filmstrip and the magnetic read head and determining if one of the portions of the optical detector field of view is increasing; and moving the magnetic read head in the direction of the corresponding portion of the field of view that is decreasing.

4. The method as defined in claim 2, further including the step of illuminating the optical pattern with a source of infrared light.

5. An apparatus for positioning a read head of a photographic apparatus above a photographic filmstrip, which is supported on an apparatus top surface and has at least one data track recorded in recording material of the filmstrip, as relative movement occurs between the filmstrip and the magnetic read head, the apparatus comprising:

an optical pattern located on the apparatus top surface beneath the photographic filmstrip such that a portion of the optical pattern is visible beyond one edge of the filmstrip;

detector means, positioned a predetermined distance relative to the read head, for optically detecting a field of view, relative to the read head, that encompasses the filmstrip edge and the portion of the optical pattern that extends beyond the filmstrip edge;

positioning means for moving the read head such that the proportion of the detector means field of view filled with the filmstrip to the proportion of the detector means field of view filled with the optical pattern is substantially constant as relative movement occurs between the filmstrip and the read head.

6. The apparatus as defined in claim 5, wherein the detector means includes:

an optical detector positioned in a predetermined location relative to the read head such that a predetermined portion of the field of view of the optical detector is filled with the filmstrip and a remaining portion of the field of view of the optical detector is filled with the optical pattern that extends beyond the filmstrip edge when the read head is properly located above the data track in the filmstrip; and signal means for producing a detector signal that indicates the relative portions of the optical detector field of view that are filled with the filmstrip and that are filled with the optical pattern as relative movement occurs between the filmstrip and the read head.

7. The apparatus as defined in claim 6, wherein the positioning means comprises:

input means for receiving the detector signal from the signal means as relative movement occurs between the filmstrip and the read head and for determining if one of the portions of the optical detector field of view is increasing; and control means for moving the read head in the direction of the corresponding portion of the optical detector field of view that is decreasing.

8. The apparatus as defined in claim 5, further comprising:

write means for writing data in the recording material of the photographic filmstrip as relative movement occurs between the photographic filmstrip and the read head.

9. The apparatus as defined in claim 5, further comprising:

a light source that produces an infrared beam of light that illuminates the optical pattern.

10. An apparatus for positioning a read head of a photographic apparatus above a photographic filmstrip, which is supported on an apparatus top surface and has at least one data track recorded in recording material of the filmstrip, as relative movement occurs between the filmstrip and the magnetic read head, the apparatus comprising:

an optical pattern located on the apparatus top surface beneath the photographic filmstrip such that a portion of the optical pattern is visible beyond one edge of the filmstrip;

an optical detector that is positioned in a predetermined location relative to the read head and having a detected field of view such that a predetermined portion of the field of view is filled with the filmstrip and includes the filmstrip edge, and a remaining portion of the field of view is filled with the optical pattern that is visible beyond the filmstrip edge when the read head is properly located above the data track in the filmstrip and that produces a detector signal that indicates the relative portions of the optical detector field of view that are filled with the filmstrip and that are filled with the optical pattern as relative movement occurs between the filmstrip and the read head;

a servo unit that receives the detector signal from the optical detector as relative movement occurs between the filmstrip and the read head and responds to the detector signal by determining if one of the portions of the optical detector field of view is increasing and then moving the read head in the direction of the corresponding portion of the optical detector field of view that is decreasing so as to maintain the relative portions of the detector signal substantially constant.

* * * * *